United States Patent
Hartung et al.

(10) Patent No.: US 11,898,618 B2
(45) Date of Patent: Feb. 13, 2024

(54) ARRANGEMENT FOR REDUCING OSCILLATION

(71) Applicant: MTU Aero Engines AG, Munich (DE)

(72) Inventors: Andreas Hartung, Munich (DE); Markus Schlemmer, Munich (DE); Malte Krack, Stuttgart (DE); Timo Theurich, Stuttgart (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 17/743,474

(22) Filed: May 13, 2022

(65) Prior Publication Data
US 2022/0373060 A1     Nov. 24, 2022

(30) Foreign Application Priority Data

May 20, 2021    (DE) .......................... 102021113167.7

(51) Int. Cl.
*F16F 15/14*      (2006.01)
*F01D 5/16*       (2006.01)
(Continued)

(52) U.S. Cl.
CPC ............ *F16F 15/1457* (2013.01); *F01D 5/10* (2013.01); *F01D 5/16* (2013.01); *F01D 5/26* (2013.01);
(Continued)

(58) Field of Classification Search
CPC ...... F16F 15/1457; F16F 7/10; F16F 2234/08; F01D 5/10; F01D 5/16; F01D 5/26; F01D 25/04; F01D 25/06
See application file for complete search history.

(56) References Cited

U.S. PATENT DOCUMENTS 2,349,187 A     5/1944   Meyer
6,827,551 B1 *   12/2004   Duffy ........................ F01D 5/16
                                                     416/500
(Continued)

FOREIGN PATENT DOCUMENTS

DE         10202995 B4     1/2004
DE         60107891 T2    12/2005
(Continued)

OTHER PUBLICATIONS

Daniel Schirrock et al., "Multi-Body Inside Damping of Hollow Blades," The Sixteenth International Congress on Sound and Vibration, Jul. 2009, pp. 1-8, International Institute of Sound and Vibration, Krakow, Poland.

*Primary Examiner* — Hoang M Nguyen
(74) *Attorney, Agent, or Firm* — LEYDIG, VOIT & MAYER, LTD.

(57) ABSTRACT

An arrangement reduces oscillation of an oscillatory structure. The arrangement has: a structure having at least one mode in at least one direction; and an oscillation-reducing device. The oscillation-reducing device includes a housing on the structure; a cavity; and a body. The body is configured to make impact contact with a first surface portion and a second surface portion of an inner wall of the housing and disposed is in the cavity such that the body can make impact contact with the first surface portion and the second surface portion of the inner wall of the housing at least temporarily for as long as the structure is excited in the at least one mode in the at least one direction. The first surface portion or the second surface portion of the inner wall of the housing has a curved profile.

19 Claims, 5 Drawing Sheets

(51) Int. Cl.
*F01D 5/26* (2006.01)
*F01D 5/10* (2006.01)
*F01D 25/04* (2006.01)
*F16F 7/10* (2006.01)
*F01D 25/06* (2006.01)

(52) U.S. Cl.
CPC ............... *F01D 25/04* (2013.01); *F16F 7/10* (2013.01); *F01D 25/06* (2013.01); *F16F 2234/08* (2013.01)

(56) References Cited

U.S. PATENT DOCUMENTS

| | | |
|---|---|---|
| 10,689,983 B2 | 6/2020 | Schlemmer et al. |
| 2001/0026039 A1 | 10/2001 | Hasegawa et al. |
| 2007/0221460 A1 | 9/2007 | Guo et al. |
| 2008/0141855 A1* | 6/2008 | Fisher ............... F04B 27/053 123/197.1 |
| 2012/0024646 A1 | 2/2012 | Tsugihashi et al. |
| 2013/0058785 A1 | 3/2013 | Kellerer et al. |
| 2014/0348639 A1 | 11/2014 | Stiehler et al. |
| 2016/0130953 A1* | 5/2016 | Brandl ............... F01D 5/16 29/889.71 |
| 2017/0044910 A1 | 2/2017 | Hartung |
| 2017/0321557 A1 | 11/2017 | Roesele et al. |
| 2018/0119552 A1 | 5/2018 | Schlemmer et al. |
| 2018/0142558 A1 | 5/2018 | Scharl |
| 2020/0190986 A1 | 6/2020 | Richter et al. |
| 2020/0240277 A1 | 7/2020 | Hartung et al. |

FOREIGN PATENT DOCUMENTS

| | | |
|---|---|---|
| DE | 102007000147 A1 | 10/2007 |
| DE | 102016207874 A1 | 11/2017 |
| DE | 102018221668 A1 | 6/2020 |
| EP | 2806106 A1 | 11/2014 |
| EP | 3130757 A1 | 2/2017 |
| EP | 3315718 A1 | 5/2018 |
| EP | 3330485 B1 | 4/2020 |
| EP | 3667020 A1 | 6/2020 |

* cited by examiner

ARRANGEMENT FOR REDUCING OSCILLATION

CROSS REFERENCE TO RELATED APPLICATIONS

This application claims benefit to German Patent Application No. DE 102021113167.7, filed on May 20, 2021, which is hereby incorporated by reference herein.

FIELD

The present disclosure relates to an arrangement for reducing oscillation.

BACKGROUND

In many technical fields, some of which are completely different, there are oscillatory structures whose oscillations, in particular the amplitudes of the modes or natural frequencies of oscillation of the structures, are reduced by known oscillation-reducing measures, such as frictional damping, attachment of additional weights, use of rheological fluids, use of active damping systems (e.g., piezo dampers), or by coupling to additional spring-mass systems. Oscillation reduction can be advantageous, for example, to extend the life of the structure, to reduce noise emitted by the structure, and/or to reduce the risk of impairment of the function of the structure.

Examples of such oscillatory structures are parts, portions and components of motors (e.g., electric motors and/or internal combustion engines), in particular of automotive engines or marine engines, of turbines, of manufacturing machines (e.g., for milling and/or turning), of engines, in particular aircraft engines, of propulsion systems (e.g., rocket propulsion systems), of constructions (e.g., buildings or bridges), of vehicles, in particular automobiles, of aircraft, of rockets, of satellites, of any means of transportation, or parts, portions and/or components in contact therewith.

SUMMARY

In an embodiment, the present disclosure provides an arrangement reduces oscillation of an oscillatory structure. The arrangement has: a structure having at least one mode in at least one direction; and at least one oscillation-reducing device. The oscillation-reducing devices includes at least one housing formed by or provided on the structure; a cavity; and at least one body. The body is configured to make impact contact with a first surface portion and a second surface portion of an inner wall of the housing and is disposed in the at least one cavity in such a manner that the at least one body is configured to make impact contacts with the first surface portion and the second surface portion of the inner wall of the housing at least temporarily for as long as the structure is excited in the at least one mode in the at least one direction. The first surface portion or the second surface portion of the inner wall of the housing has a curved profile.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Aspects of the present disclosure provide an improved technique of oscillation reduction.

In accordance with an aspect of the present disclosure, an arrangement for reducing oscillation of an oscillatory structure includes:
a structure having at least one mode in at least one direction, and
at least one oscillation-reducing device including at least one housing formed by or provided on the structure and having a cavity, in particular a closed cavity, and further including at least one body for making impact contacts with a first surface portion and a second surface portion of an inner wall of the housing and disposed in the at least one cavity in such a manner that it makes impact contacts with the first surface portion and the second surface portion of the inner wall of the housing at least temporarily, in particularly continuously, for as long as the structure is excited in the at least one mode in the at least one direction (by external excitation, self-excitation and/or parameter excitation and/or by initial conditions), wherein:
the first surface portion and/or the second surface portion of the inner wall of the housing have/has a curved profile.

The curved profile may be convex; i.e., form an inward bulge into the cavity (which hereinafter corresponds to a positive curvature) and/or may be concave; i.e., form an outward bulge of the cavity (which hereinafter corresponds to a negative curvature).

The at least one mode of the structure is an oscillation, in particular a natural frequency of oscillation, in which the structure can oscillate and/or be excited.

In an embodiment, oscillations of the structure, such as vibrations, can be particularly effectively avoided or at least reduced, preferably at least significantly reduced, by the continuous, impact-based momentum exchange, in particular by means of substantially elastic impacts. In particular, in an embodiment, the oscillation amplitudes of the structure can be significantly reduced with a comparatively small total mass of the at least one body without at the same time requiring the body or bodies to be positioned at the location of maximum mode amplitude, which, depending on the design of the particular structure (e.g., a bridge), may be impossible or difficult to achieve because of geometric or structural limitations.

In an embodiment, since the momentum exchange between the structure and the at least one body via the housing; i.e., between the structure and one or more bodies via the housing in whose cavity the at least one body is disposed, can be effected by substantially elastic impacts, in particular with an energy dissipation (e.g., by friction) per oscillation period of no more than 20%, preferably no more than 10%, in particular no more than 5% relative to the kinetic energy associated with the oscillation, oscillations of the structure can be particularly effectively reduced with only small additional masses of the body or bodies.

Compared to a case where both the first and second surface portions of the inner wall of the housing are planar surface portions, the design in which at least one of the first and second surface portions has a curved profile makes it possible to achieve improved energy transfer from the at least one body into the higher modes of the structure.

In an embodiment, the at least one body is a sphere having a radius R, and it holds for a curvature k of the curved profile that $$-\frac{1}{R} \leq k \leq \frac{1}{R},$$

in particular that $$-\frac{1}{R} \leq k \leq -\frac{1}{4R} \text{ or } \frac{1}{4R} \leq k \leq \frac{1}{R}.$$

In an embodiment, it holds for the curvature k that k≠0.

In an embodiment, it holds for the curvature k of the curved profile that $$k = -\frac{1}{R},$$

or it holds for the curvature k of the curved profile that $$k = \frac{1}{R}.$$

In an embodiment, this makes it possible to achieve optimum energy transfer from the at least one body into the higher modes of the structure.

In some embodiments, the oscillation-reducing device has a plurality of the in particular closed cavities described, and a plurality of the bodies described. The present description of "at least one" cavity and "at least one" body may apply accordingly to each cavity and each body of the oscillation-reducing device.

In some embodiments, the number of cavities and/or bodies is, for example, 1, 2, 3, 4, 5, 10, 20, 100, 150, 200 or more, or is in a range of from 1 to 300, 1 to 200, 1 to 150, 1 to 100, 1 to 50, 1 to 30, 2 to 10, or 5 to 30.

Preferably, the majority of the cavities or each cavity of the oscillation-reducing device have/has only one (i.e., exactly one) body disposed therein.

The substantially elastic impacts may occur between metallic and/or ceramic contact or impact surfaces of the respective body and the respective cavity or housing.

In an embodiment, a third surface portion of the inner wall extending parallel to the at least one direction is a planar surface portion.

In an embodiment, this allows the at least one body to roll along the at least one direction.

In an embodiment, the first and second surface portions of the inner wall have the curved profile.

In an embodiment, this makes it possible to further improve the energy transfer from the at least one body into the higher modes of the structure. In an embodiment, all surface portions of the inner wall except the third surface portion have a curved profile.

In an embodiment, the oscillation-reducing device reduces a maximum oscillation amplitude in the at least one mode by at least 5%, 20%, 30%, 40% or 50% compared to the oscillation amplitude in the at least one mode without an oscillation-reducing device.

In an embodiment, the structure is at least a part or portion of a gas turbine, in particular of an aircraft engine, in particular a stator vane or a rotor blade, of a motor, in particular of an electric motor and/or an internal combustion engine, in particular of an automotive engine or a marine engine, of a turbine, of a manufacturing machine, in particular for milling and/or turning, of an engine, in particular of an aircraft engine, of a propulsion system, e.g., of a rocket propulsion system, of a construction, in particular of a building or a bridge, of a vehicle, in particular of an automobile, of an aircraft, of a rocket, of a satellite, or of any means of transportation, a part in contact therewith, or a portion in contact therewith.

In an embodiment, the total mass of the at least one body, in particular of all bodies of the oscillation-reducing device taken together, is at least 100 times, preferably at least 1000 times, in particular at least 10000 times smaller than the structure's modal mass that oscillates in the respective mode and/or the modal mass oscillating in the respective mode is no more than 200000 times, preferably no more than 100000 times, in particular no more than 50000 times greater than the total mass of the at least one body. There is an embodiment of the present disclosure for each combination of these upper and lower limits.

In an embodiment, the at least one oscillation-reducing device is or are disposed on the structure only in those regions where the oscillation amplitude in the at least one mode without an oscillation-reducing device in the respective region is at least 0.1%, preferably at least 1% and/or no more than 100%, 50%, 20%, 10%, 5%, 1%, 0.5%, 0.2% of the maximum oscillation amplitude in the at least one mode without an oscillation-reducing device in the respective region. There is an embodiment of the present disclosure for each combination of these upper and lower limits.

In an embodiment, a clearance for movement B of at least one of the one or more bodies, in particular of all of the bodies, in at least one direction, in particular in all directions, is no more than 2 times, preferably no more than 1 times, in particular no more than 0.5 times an in particular maximum cross-sectional dimension of the body and/or at least 0.05 times, preferably at least 0.1 times, in particular at least 0.2 times an in particular maximum cross-sectional dimension of body 16. There is an embodiment of the present disclosure for each combination of these upper and lower limits.

In an embodiment, the at least one body has a metallic or ceramic surface, and the first surface portion and/or the second surface portion of the inner wall of the housing is a metallic and/or ceramic surface, so that the impact contacts occur between metal and metal, between ceramic and ceramic, or between metal and ceramic.

In an embodiment, the first surface portion and the second surface portion are opposite each other and/or one of the first and second surface portions is convexly or concavely curved and/or the other of the first and second surface portions is convexly or concavely curved or is planar. All of the following combinations are possible: convex-convex, convex-concave and vice versa, convex-planar and vice versa, concave-planar and vice versa.

Figure 1:
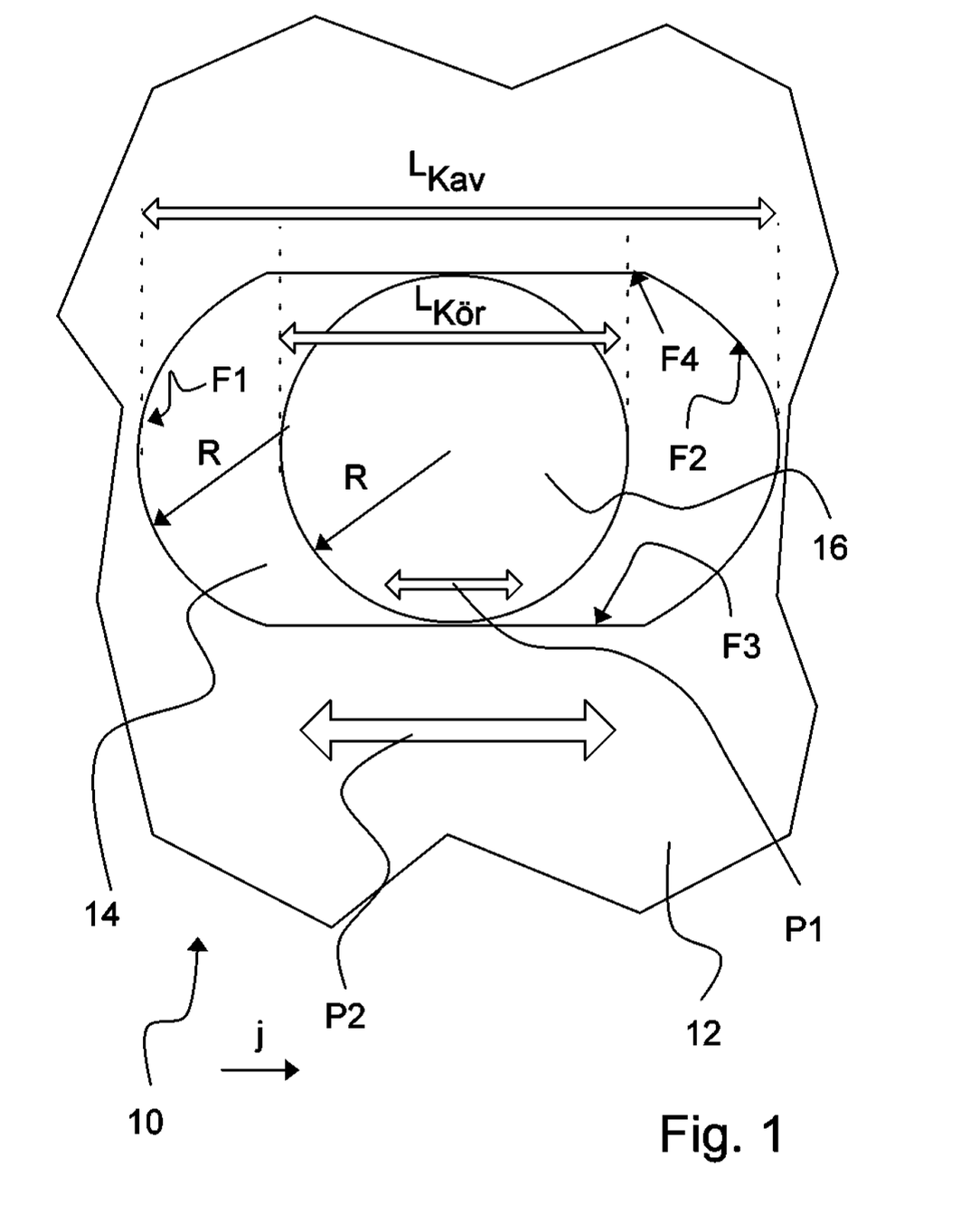
FIG. 1 shows an arrangement according to an aspect of the present disclosure.

FIG. 1 shows an arrangement 10 according to an embodiment of the present disclosure.

Arrangement 10 includes an oscillatory structure 12, and an oscillation-reducing device intended to at least reduce oscillation of structure 12.

The oscillation-reducing device includes a housing having a cavity 14, in the embodiment shown a closed cavity 14, which housing is formed by structure 12 and encloses or defines cavity 14, and further includes a body 16 which, for example, may include a metal or a ceramic or may be made of metal or ceramic, and which is disposed in cavity 14 in such a way that it can freely move with play in at least one direction j, as illustrated by the double-headed arrow P1 shown in cavity 14.

Furthermore, the arrangement may include a plurality of housings, each of which is formed by structure 12 or is attached or connected to structure 12, and each of which encloses or defines a cavity 14 having at least one body 16 disposed therein. The individual cavities 14 and the respective bodies 16 may be configured such that the bodies 16 disposed in different cavities 14 can freely move with play in different directions.

Structure 12 may be at least a part or portion of a gas turbine, in particular of an aircraft engine, in particular a stator vane or a rotor blade, of a motor, in particular of an electric motor and/or an internal combustion engine, in particular of an automotive engine or a marine engine, of a turbine, of a manufacturing machine, in particular for milling and/or turning, of an engine, in particular of an aircraft engine, of a propulsion system, e.g., of a rocket propulsion system, of a construction, in particular of a building or a bridge, of a vehicle, in particular of an automobile, of an aircraft, of a rocket, of a satellite, or of any means of transportation, a part in contact therewith, or a portion in contact therewith.

Structure 12 has at least one mode or mode of oscillation or natural frequency of oscillation in which structure 12 can be excited to oscillate or vibrate during normal intended use. In the embodiment shown in FIG. 1, structure 12, when excited in the at least one mode, oscillates back and forth along direction j, as illustrated by the double-headed arrow P2 shown on structure 12.

Body 16, which is spherical in shape; i.e., a sphere with a radius R, is disposed in cavity 14 so as to make impact contacts with the housing formed by structure 12 and having the cavity 14, and in such a manner that it makes impact contacts with the housing, and thus with structure 12, at least temporarily, in one embodiment continuously, for as long as structure 12 is excited in the at least one mode, as a result of which a maximum oscillation amplitude in the mode is reduced by at least 50% compared to a case where no oscillation-reducing device is provided.

A clearance for movement B of body 16 in cavity 14, in particular while making the impact contacts with the housing, is defined by a length $L_{Kav}$ of cavity 14 in the direction of movement j minus the length $L_{Kör}$ of body 16 in the direction of movement j.

Cavity 14, or an inner wall of the housing having the cavity 14, has a first surface portion F1 and a second surface portion F2 with which body 16 makes impact contacts at least temporarily, in one embodiment continuously, for as long as structure 12 is excited in at least one mode, both the first surface portion F1 and the second surface portion F2 having a curved profile. A curvature k of the curved profile of each of the surface portions F1 and F2 is $$-\frac{1}{R}.$$

This makes it possible to achieve optimum energy transfer from body 16 into the higher modes of the structure. In the example of FIG. 1, each of the surface portions F1 and F2 is concavely curved. Cavity 14, or an inner wall of the housing, further has a third surface portion F3 and a fourth surface portion F4, which extend parallel to direction j and are planar. This enables the body 16 to roll on these surface portions F3 and F4. However, it is preferred that one of the surface portions F3 and F4 also have a curved profile, so that only one of the surface portions F3 and F4 is planar.

Figure 2:
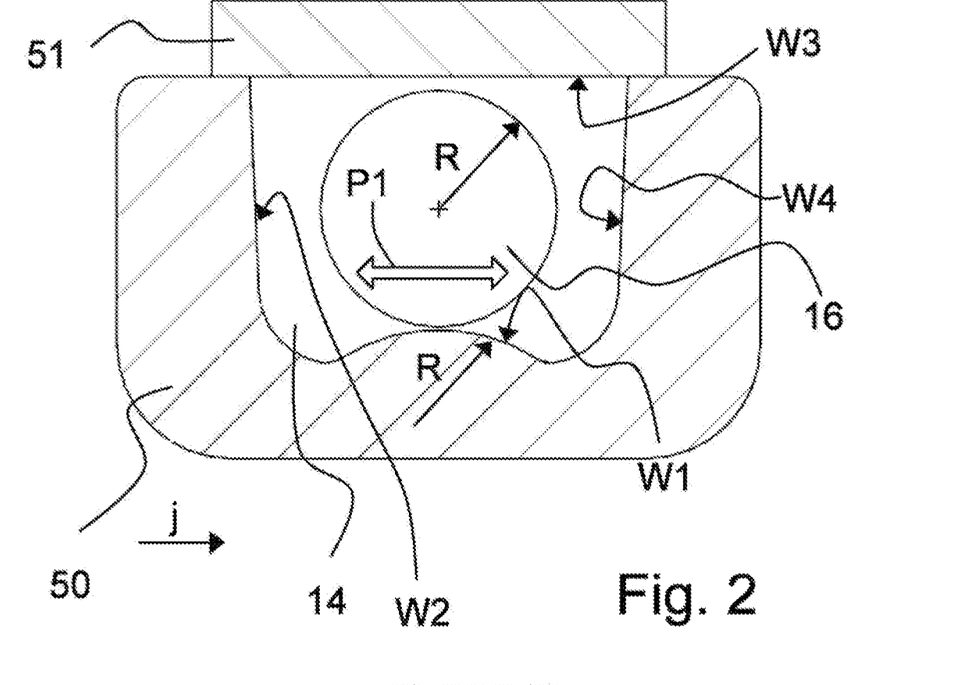
FIG. 2 shows a cross-sectional view of an oscillation-reducing device according to an aspect of the present disclosure.

FIG. 2 shows a cross-sectional view of an oscillation-reducing device according to an embodiment of the present disclosure.

The oscillation-reducing device has a housing including a housing body 50 and a housing cover 51, in which a spherical body 16 having a sphere radius R is disposed, which, as long as structure 12 is excited in the at least one mode, moves at least temporarily, in one embodiment continuously, along direction j, as illustrated by double-headed arrow P1. Here, the surface portion W1 of the inner wall of housing body 50 has a convex curved profile, whose curvature is $$=\frac{1}{R},$$

while the opposite surface portion W3, which is formed by the inner wall of housing cover 51, is planar or flat so that body 16 can roll thereon. The opposite surface portions W2 and W4 of the inner wall of housing body 50, with which body 16 makes the impact contacts when the structure is excited in the mode, have a curved profile and are oblique with respect to direction j, in particular not perpendicular to direction j.

Figure 3:
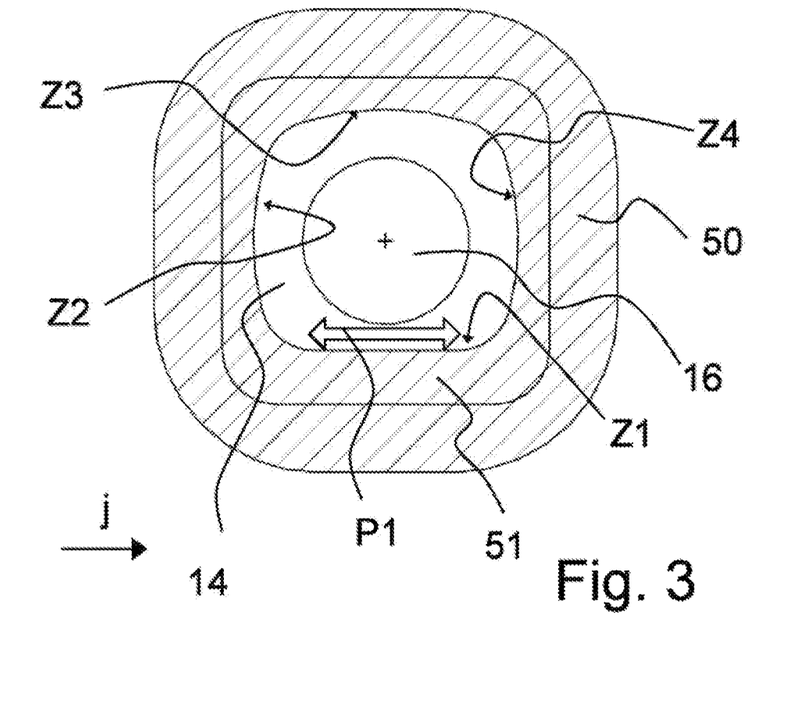
FIG. 3 shows a plan view of an oscillation-reducing device according to an aspect of the present disclosure.

FIG. 3 shows a plan view of an oscillation-reducing device according to an embodiment of the present disclosure.

The oscillation-reducing device has a housing including a housing body 50 and a housing cover 51, as well as a body 16 which is disposed in the housing and which, as long as structure 12 is excited in the at least one mode, moves at least temporarily, in one embodiment continuously, along direction j, as illustrated by double-headed arrow P1. Here, one surface portion Z1 of the inner wall of housing body 50 is planar so that body 16 can roll thereon, while the other surface portions Z2, Z3 and Z4 each have a curved profile. In the example of FIG. 3, each of the surface portions Z2, Z2 and Z4 is concavely curved.

Figure 4:
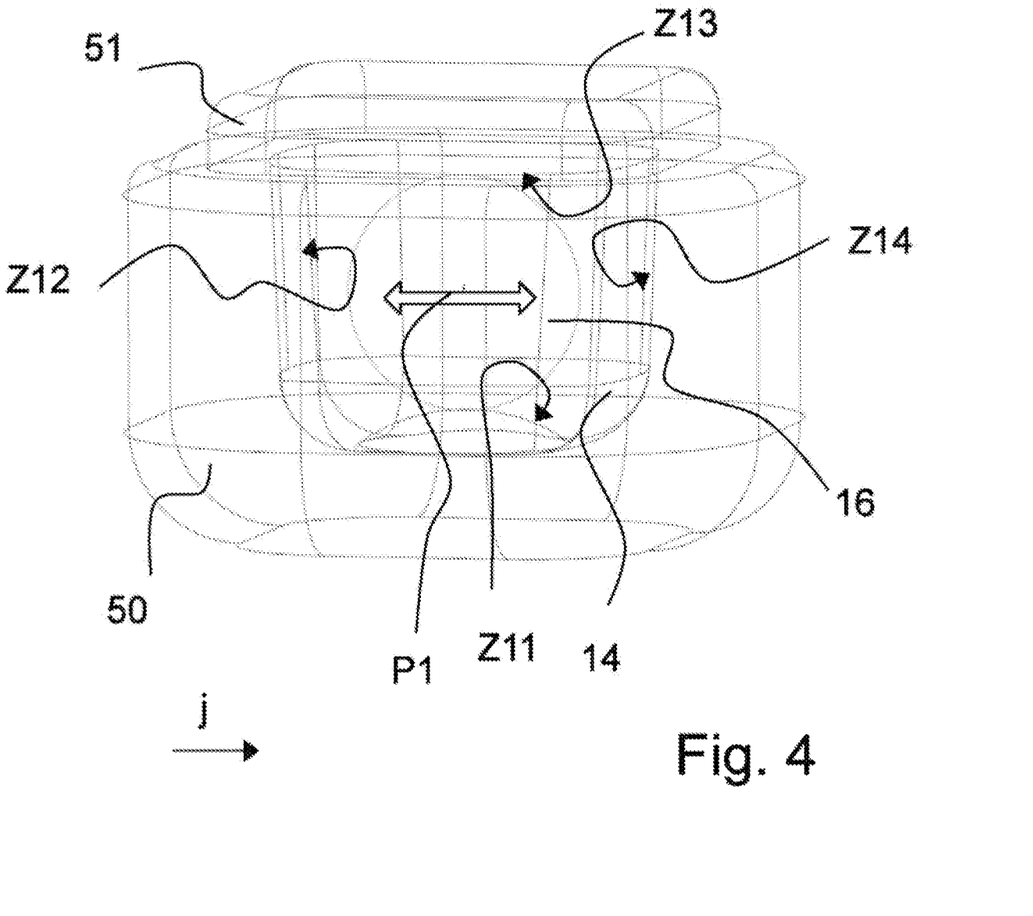
FIG. 4 shows a three-dimensional view of an oscillation-reducing device according to an aspect of the present disclosure.

FIG. 4 shows a three-dimensional view of an oscillation-reducing device according to an embodiment of the present disclosure.

The oscillation-reducing device has a housing including a housing body 50 and a housing cover 51, as well as a body 16 which is disposed in the housing and which, as long as structure 12 is excited in the at least one mode, moves at least temporarily, in one embodiment continuously, along direction j, as illustrated by double-headed arrow P1. Here, the surface portions Z11, Z12 and Z14 of the inner wall of housing body 50 are curved, while the surface portion Z13 of the inner wall of housing cover 51 is planar or flat.

The effect and effectiveness of the oscillation reduction by impact contacts and momentum transfers using the oscillation-reducing device will be explained in more detail with reference to FIGS. 5 and 6, which show an experimentally confirmed behavior.

Figure 5A:
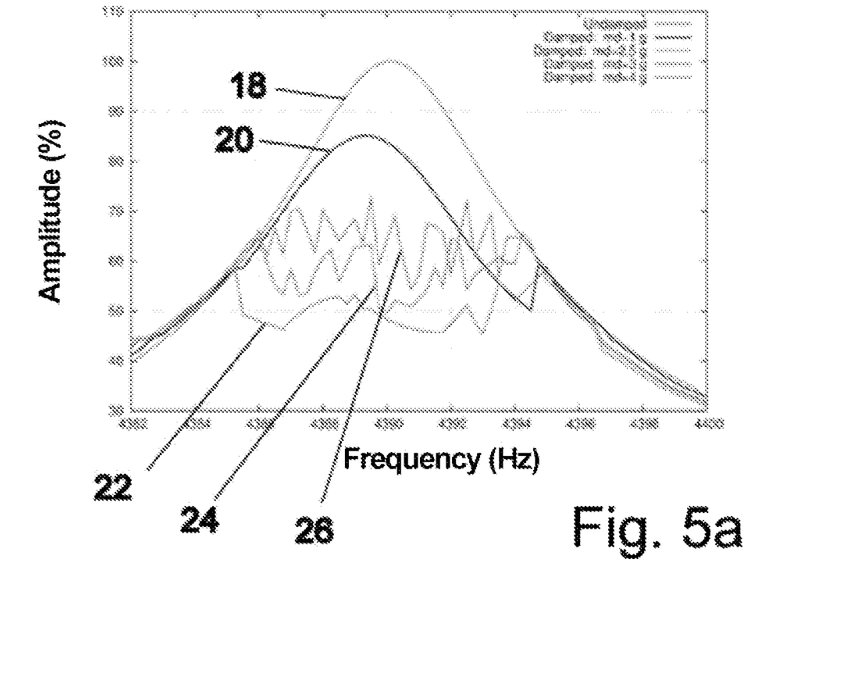
FIGS. 5a-b and FIGS. 6a-b show the effect and effectiveness of the oscillation reduction by an arrangement according to an aspect of the present disclosure.

FIG. 5a shows oscillation curves; i.e., amplitude-frequency curves, for an oscillatory structure without an oscillation-reducing device (curve 18), with an oscillation-reducing device having a body 16 with a mass of 1 g (curve 20), with an oscillation-reducing device having a body 16 with a mass of 2.5 g (curve 22), with an oscillation-reducing device having a body 16 with a mass of 3 g (curve 24), and with an oscillation-reducing device having a body 16 with a mass of 4 g (curve 26). In each of the curves 20-26, the clearance for movement B is 0.2 mm.

FIG. 5a clearly shows that when impact contacts are made, in particular continuously, by bodies 16 having larger masses (curves 22, 24, 26), the oscillation amplitude of the mode can be significantly reduced compared to arrangements without impact contacts or with impact contacts of a body 16 having a smaller mass (curves 18, 20).

Figure 5B:
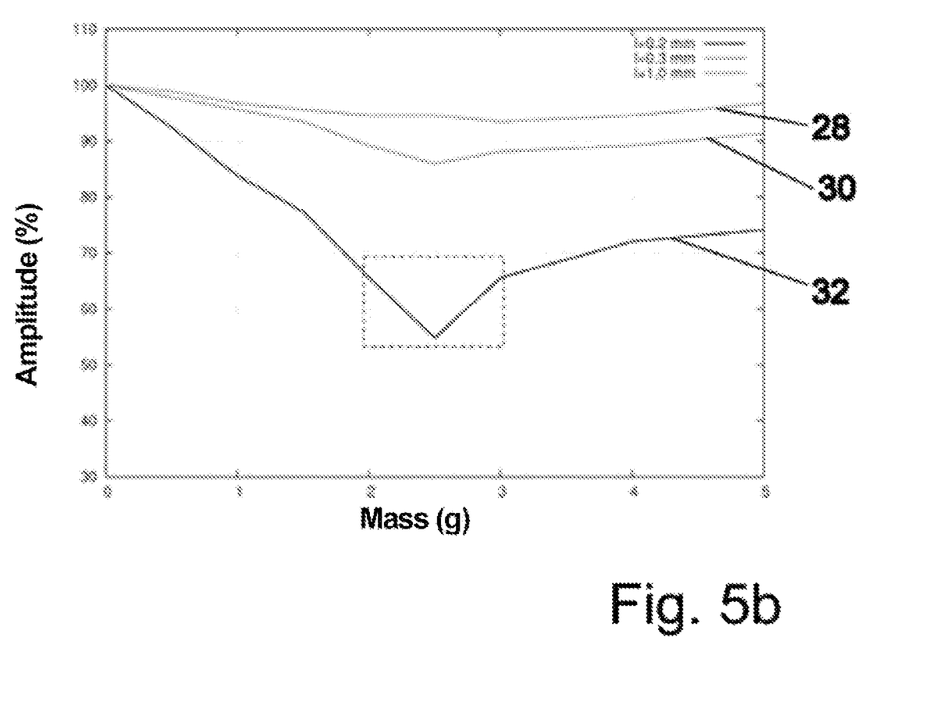

FIG. 5b shows, for the example of FIG. 5a, the dependence of the reduction in oscillation amplitude on the mass of body 16 for a clearance for movement of 1.0 mm (curve 28), 0.3 mm (curve 30), and 0.2 mm (curve 32), respectively.

Figure 6A:
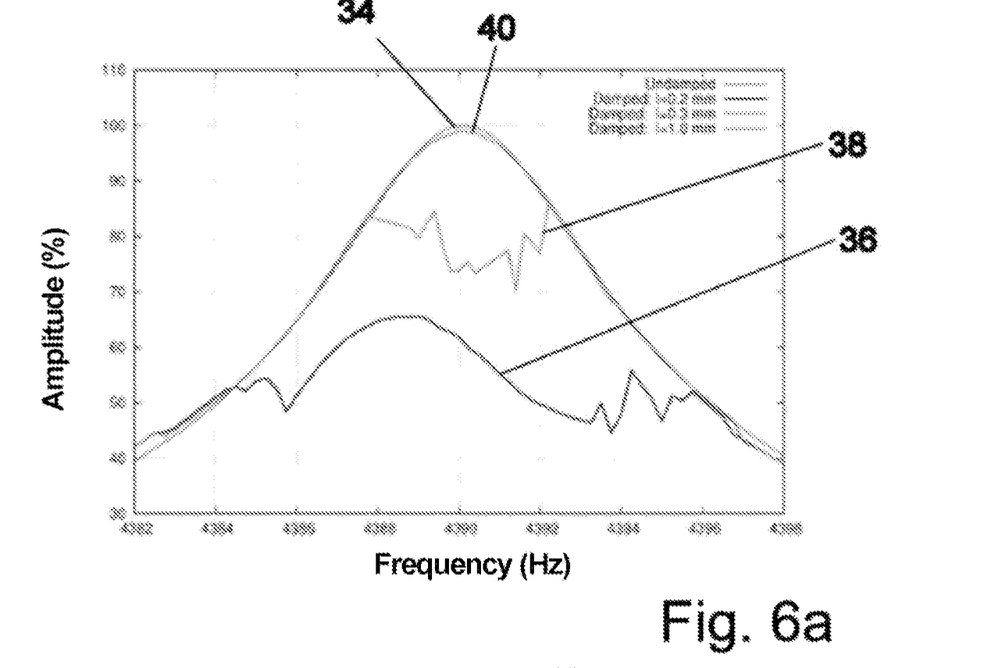

FIG. 6a shows oscillation curves for an oscillatory structure 12 without an oscillation-reducing device (curve 34) and for one with an oscillation-reducing device having a body 16 with a mass of 2 g and with a clearance for movement B of 0.2 mm (curve 36), 0.3 mm (curve 38), and 1.0 mm (curve 40), respectively.

Figure 6B:
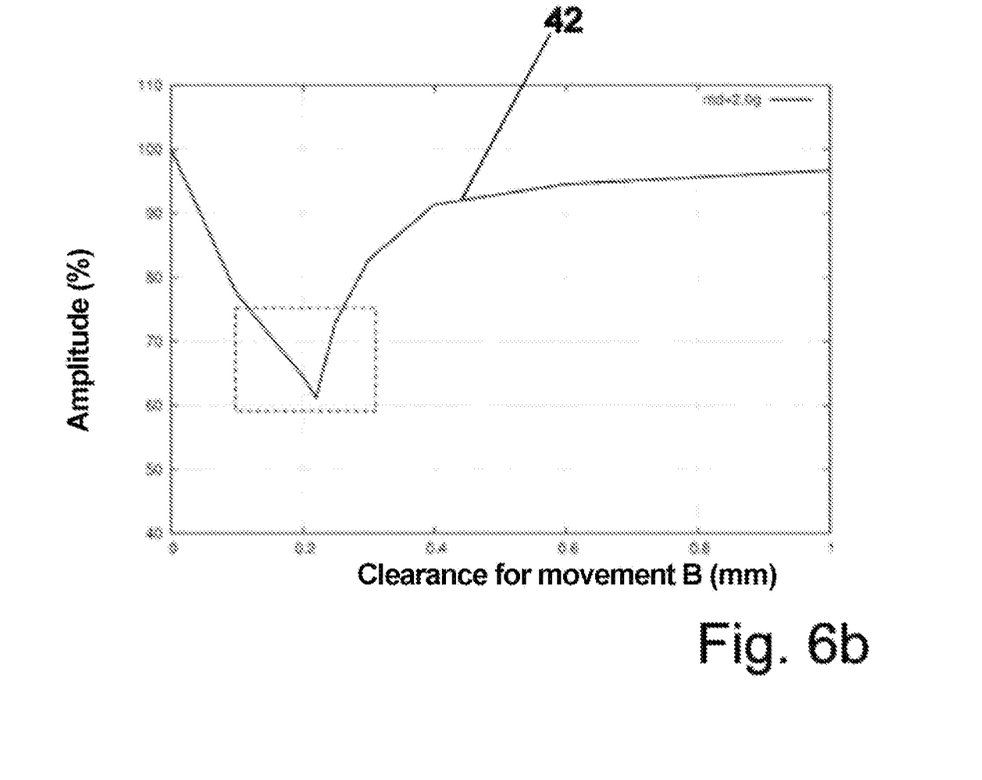

FIG. 6b shows, for the example of FIG. 6a, the dependence of the reduction in amplitude on the clearance for movement B of the body 16 with a mass of 2 g (curve 42).

In the examples of FIGS. 5 and 6, the impacts are substantially elastic and the energy dissipation by friction is low, in particular less than 5% per period of the kinetic energy of body 16 associated with the oscillation.

While exemplary embodiments have been presented in the foregoing detailed description, it should be appreciated that many modifications are possible. It should also be appreciated that the exemplary embodiments are only examples, and are not intended to limit the scope, applicability, or configuration in any way. Rather, the foregoing detailed description will provide those skilled in the art with a convenient road map for implementing at least one exemplary embodiment, it being understood that various changes may be made in the function and arrangement of elements described without departing from the scope of protection as set forth in the appended claims or derived from combinations of features equivalent thereto.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 arrangement for reducing oscillation
12 structure
14 cavity
16 body
18 amplitude-frequency curve without an oscillation-reducing device
20 amplitude-frequency curve with a body having a mass of 1 g
22 amplitude-frequency curve with a body having a mass of 2.5 g
24 amplitude-frequency curve with a body having a mass of 3 g
26 amplitude-frequency curve with a body having a mass of 4 g
28 amplitude-mass curve for a clearance for movement of 1.0 mm
30 amplitude-mass curve for a clearance for movement of 0.3 mm
32 amplitude-mass curve for a clearance for movement of 0.2 mm
34 amplitude-frequency curve without an oscillation-reducing device
36 amplitude-frequency curve with a body having a mass of 2 g and a clearance for movement of 0.2 mm
38 amplitude-frequency curve with a body having a mass of 2 g and a clearance for movement of 0.3 mm
40 amplitude-frequency curve with a body having a mass of 2 g and a clearance for movement of 1.0 mm
42 amplitude-clearance of movement curve with a body having a mass of 2 g
50 housing body
51 housing cover
F1-F4 surface portions
W1-W4 surface portions
Z1-Z4 surface portions
Z11-Z14 surface portions

The invention claimed is:

1. An arrangement for reducing oscillation of an oscillatory structure, the arrangement comprising:
a structure having at least one mode in at least one direction; and
at least one oscillation-reducing device comprising at least one housing formed by or provided on the structure; a cavity having only one body disposed therein; the body being configured to make substantially elastic impact contacts with a first surface portion and a second surface portion of an inner wall of the housing and disposed in the cavity in such a manner that the body is configured to make impact contacts with the first surface portion and the second surface portion of the inner wall of the housing at least temporarily for as long as the structure is excited in the at least one mode in the at least one direction,
wherein the first surface portion and the second surface portion of the inner wall of the housing each have a respective curved profile,
wherein the first surface portion and the second surface portion are opposite each other and a line between a center of the respective curve profile for each of the first surface and the second surface extends in a first direction,
wherein dimensions of the cavity confine a movement direction of the body to be parallel to the first direction.

2. The arrangement as recited in claim 1, wherein the body is a sphere having a radius R is, and wherein for a curvature k of the curved profile.

$$-\frac{1}{R} \le k \le \frac{1}{R}.$$

3. The arrangement as recited in claim 2, wherein $k \ne 0$.

4. The assembly as recited in claim 2, wherein:

$$k = -\frac{1}{R},$$

or $$k = \frac{1}{R}.$$

5. The arrangement as recited in claim 1, wherein a third surface portion of the inner wall extending parallel to the at least one direction is a planar surface portion.

6. The arrangement as recited in claim 1, wherein the oscillation-reducing device is configured to reduce a maximum oscillation amplitude in the at least one mode by at least 5%, 20%, 30%, 40% or 50% compared to the oscillation amplitude in the at least one mode without the oscillation-reducing device.

7. The arrangement as recited in claim 1, wherein the structure is at least a part or a portion of a gas turbine, of a motor, of a turbine, of a manufacturing machine, of a propulsion system, of a construction, or of a vehicle, a part in contact therewith, or a portion in contact therewith.

8. The arrangement as recited in claim 1, wherein a total mass of the body is at least 100 times smaller than the structure's modal mass that oscillates in the respective mode or the modal mass oscillating in the respective mode is no more than 200000 times greater than the total mass of the at least one body.

9. The arrangement as recited in claim 1, wherein the at least one oscillation-reducing device is disposed on the structure only in those regions where the oscillation amplitude in the at least one mode without the oscillation-reducing device in the respective region is at least 0.1%, or no more than 100% of the maximum oscillation amplitude in the at least one mode without the oscillation-reducing device in the respective region.

10. The arrangement as recited in claim 1, wherein a clearance for movement of the body in the movement direction is no more than 2 times a maximum cross-sectional dimension of the body or at least 0.05 times the maximum cross-sectional dimension of the body.

11. The arrangement as recited in claim 1, wherein the body has a metallic or ceramic surface, and the first surface portion or the second surface portion of the inner wall of the housing is a metallic surface or a ceramic surface, so that the impact contacts occur between metal and metal, between ceramic and ceramic, or between metal and ceramic.

12. The arrangement as recited in claim 1, wherein one of the first and second surface portions is convexly or concavely curved, and the other of the first and second surface portions is convexly or concavely curved.

13. The arrangement as recited in claim 1, wherein the cavity is a closed cavity and the body is configured to make impact contacts with the first surface portion and the second surface portion of the inner wall of the housing at continuously for as long as the structure is excited in the at least one mode in the at least one direction.

14. The arrangement as recited in claim 1, wherein the at least one body is a sphere having a radius R is, and wherein for a curvature k of the curved profile, $-1/R \le k \le -1/4R$ or $1/4R \le k \le 1/R$.

15. The arrangement as recited in claim 1,
wherein the cavity is one of a plurality of cavities,
wherein the body is one of a plurality of bodies, each of the bodies assigned to a respective one of the cavities,
wherein a total mass of all of the bodies of the oscillation-reducing device is at least 100 times smaller than the structure's modal mass that oscillates in the respective mode or the modal mass oscillating in the respective mode is no more than 200000 times greater than the total mass of all of the bodies.

16. The arrangement as recited in claim 1,
wherein the cavity is one of a plurality of cavities,
wherein the body is one of a plurality of bodies, each of the bodies assigned to a respective one of the cavities, and
wherein for each of the bodies in the respective one of the cavities, a clearance for movement of body in all directions is no more than 2 times a maximum cross-sectional dimension of the bodies or at least 0.05 times the particular maximum cross-sectional dimension of the body.

17. The arrangement as recited in claim 5, wherein a fourth surface portion of the inner wall extending parallel to the at least one direction is a planar surface portion, and wherein a gap between the third surface and fourth surface is configured so as to confine the body to movement in the movement direction.

18. The arrangement of claim 17, wherein the respective curve profile for each of the first surface and the second surface is concave.

19. The arrangement of claim 1, wherein the first direction comprises with the at least one direction of the mode.

* * * * *